United States Patent [19]
Hoadley

[11] 3,744,894
[45] July 10, 1973

[54] SERVO AMPLIFIER FOR A SELF-POSITIONING SYSTEM

[75] Inventor: Harvey Orlo Hoadley, Rochester, N.Y.

[73] Assignee: Eastman Kodak Company, Rochester, N.Y.

[22] Filed: May 4, 1971

[21] Appl. No.: 139,328

[52] U.S. Cl.................. 353/101, 318/681, 352/140
[51] Int. Cl. ...... G03b 3/00, G03b 21/14, G03f 1/08
[58] Field of Search.......................... 318/681, 345; 353/101; 352/140

[56] References Cited
UNITED STATES PATENTS

| | | | |
|---|---|---|---|
| 3,466,125 | 9/1969 | Jordan et al. | 353/101 |
| 3,406,309 | 10/1968 | Martens | 318/681 |
| 3,494,694 | 2/1970 | Morita | 353/101 |

*Primary Examiner*—Louis R. Prince
*Assistant Examiner*—Steven L. Stephan
*Attorney*—Robert W. Hampton, Paul R. Holmes and Robert W. Weig

[57] ABSTRACT

A servo amplifier for use with a DC motor and an AC power source. The motor is driven in a direction and by an amount determined by the polarity and amplitude, respectively, of an input half-wave rectified current which is controlled by a bridge at the input of the amplifier. The direction and degree of unbalance in the bridge determine the polarity and amplitude of the current. Such bridge unbalance can be used, for example, to indicate the amount and direction a projector is out of focus. By incorporating this circuit in a projector, correct focus can be automatically retained as slides or frames are sequenced. The "dead zone," i.e., the amount of input signal variance allowed before current flows turning the motor is reduced in existing automatic focusing systems when the invention is incorporated therein.

9 Claims, 3 Drawing Figures

HARVEY ORLO HOADLEY
INVENTOR.

HARVEY ORLO HOADLEY
INVENTOR.

BY *Robert W. Weir*

AGENT

SERVO AMPLIFIER FOR A SELF-POSITIONING SYSTEM

FIELD OF THE INVENTION

The invention relates to a self-positioning system and more particularly to a servo amplifier controlled self-positioning system wherein the servo amplifier output is determined by the amount and direction of unbalance in a bridge circuit.

CROSS-REFERENCE TO RELATED APPLICATION

Reference is made to commonly assigned copending U.S. patent application Ser. No. 139,329, entitled "Electrical Motor Damping Circuit for a Self-Positioning System," in the name of the present inventor, Harvey O. Hoadley, filed concurrently with the presently filed application on

BACKGROUND OF THE INVENTION

The classic photographic projector utilizes a source of light passing through a condensing lens system to illuminate a photographic transparency. The image of the transparency is projected upon a viewing screen through a movable objective lens. In the typical system, the objective lens is displaced along the optical axis of the system to chamber the focal distance to the object plane so as to make it optically conjugate to the plane of the viewing screen. The usual practice is to maintain the screen or viewing surface at a fixed distance, and adjust the distance from the transparency to the object lens to accommodate for various spurious conditions in the surface of the transparency resulting either from the thermal environment in which the transparency is utilized or from inherent defects in the transparency itself or in its supporting frame.

Several solutions have been proposed to accommodate the spurious changes in the slide transparency and various automatic focusing devices for adjusting the distance from the slide to the objective lens have been developed. Exemplary of these is a device disclosed in U. S. Pat. No. 3,249,001 to Stauffer which utilizes a pair of spaced photoelectric cells which, when the projector is in proper focus, are equally illuminated by the reimage of radiant energy reflected from the surface of the projected transparency. As the transparency is displaced from an optimally focused position resulting from spurious changes in the transparency, it is effectively moved a small amount along the optical axis of the system with the concomitant effect that the reimage of the reflected energy also moves to illuminate more intensely one of the photoelectric cells. An electrical signal is derived from the photoelectric cells which is a function of this difference in light intensities incident on the two cells, and a reversible DC motor is driven by the signal so as to move the objective lens, thus adjusting the position of the reimage to the null or balance point on the photoelectric cells. No provision is made for adjusting the electrical "dead zone" which results from predetermined limitations within the circuitry.

SUMMARY OF THE INVENTION

The instant invention relates to a self-positioning system including a servo amplifier used to drive a DC motor from power supplied by an AC source. Driving the motor is a half-wave rectified current from the AC source in a direction and by an amount determined by the polarity and amplitude, respectively, of an unbalanced bridge-produced signal. The electrical dead zone, i.e., the amount of signal variance tolerated by the motor before it moves, is adjustable and can be adjusted to be effectively zero in a self-focusing projector.

One of the objects of the present invention is to substantially reduce the electrical dead zone typical of prior art servo amplifier driven self-focusing devices.

Another object of the invention is to reduce the number of electrical components in a self-positioning automatic focusing system.

Yet another object of the present invention is to provide a servo amplifier in which the electrical dead zone is adjustable to meet the particular requirements of a chosen application.

Still another object of the present invention is to provide a servo amplifier in which the electrical dead zone can be adjustably reduced to effectively zero as compared to dead zones in prior art devices.

One advantage of the invention is that the dead zone may be made as large or as small as desired to be suitable for the desired application.

Another advantage of the present invention is that it is more economical than the above-mentioned typical prior art system since fewer componenets are used in practicing the invention.

The novel features which are believed to be characteristic of the invention are set forth with particularity in the appended claims. The invention itself, however, both as to its organization and method of operation, together with further objects and advantages thereof, may best be understood by reference to the description to follow taken in connection with the accompanying drawings.

While the invention will be described in connection with a preferred embodiment thereof, it will be understood that it is not intended to limit the invention to that embodiment.

DESCRIPTION OF THE PRIOR ART DEVICE

Figure 1:
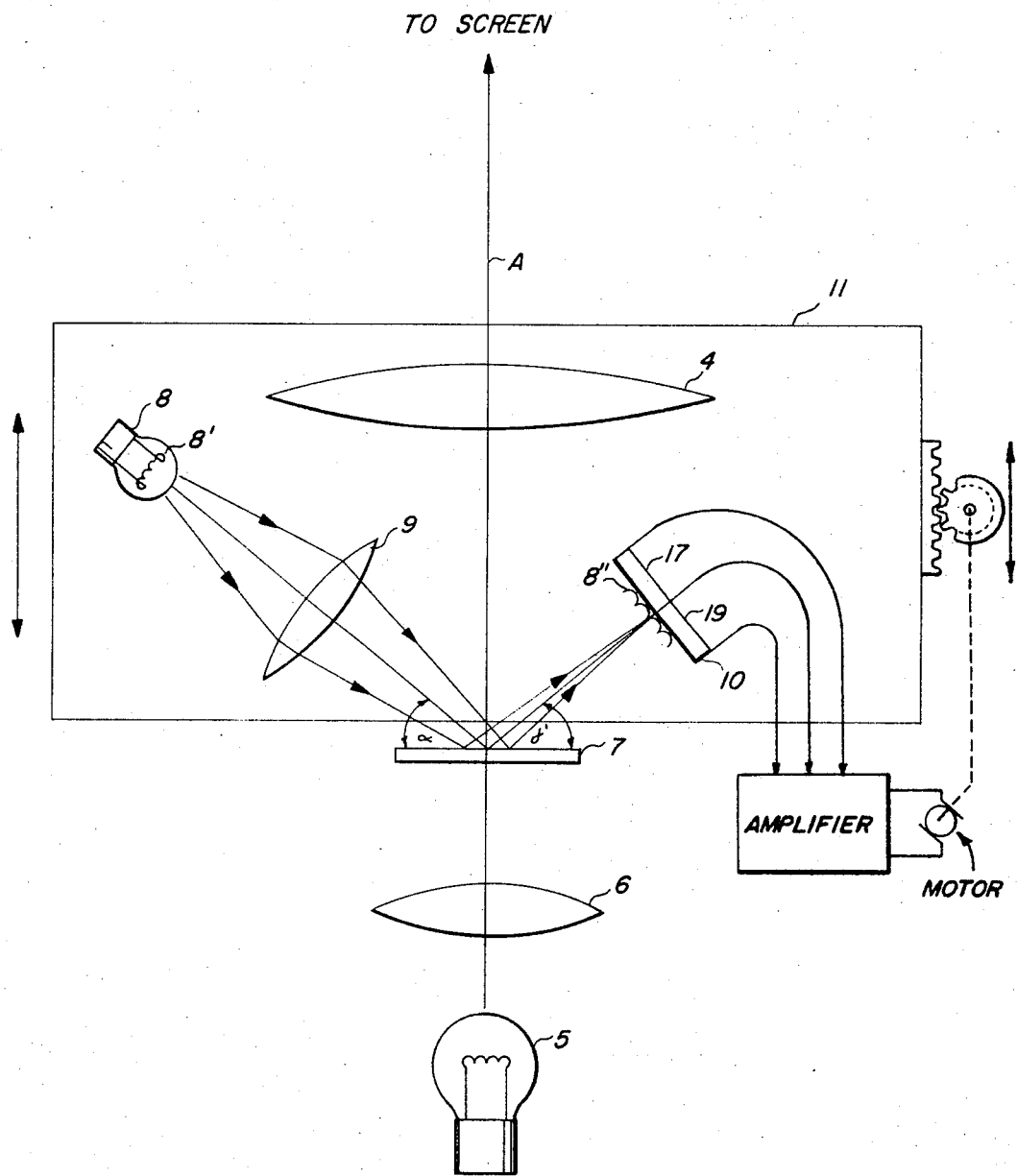
FIG. 1 is a schematic drawing of a typical, optical projection apparatus employing a sensor system for use with the self-positioning circuitry of the invention.

Turning to the drawings, FIG. 1 shows in schematic form a device for use with the self-focusing circuitry of the invention. It is well known to those skilled in the art that transparencies undergo physical changes referred to as creeping, buckling or popping which distorts the planar face of the transparency. Some of these spurious conditions are the result of the changing thermal environment experienced by the transparency, while others are due to defects in the photographic processing of the transparency or to the somewhat wide manufacturing tolerances in the cardboard or plastic transparency frame allowed by some manufacturers. The net result is that the transparency is effectively moved along the optical or projection axis so that steps must be taken to adjust the position of the objective lens to ensure proper focusing.

Figure 2:
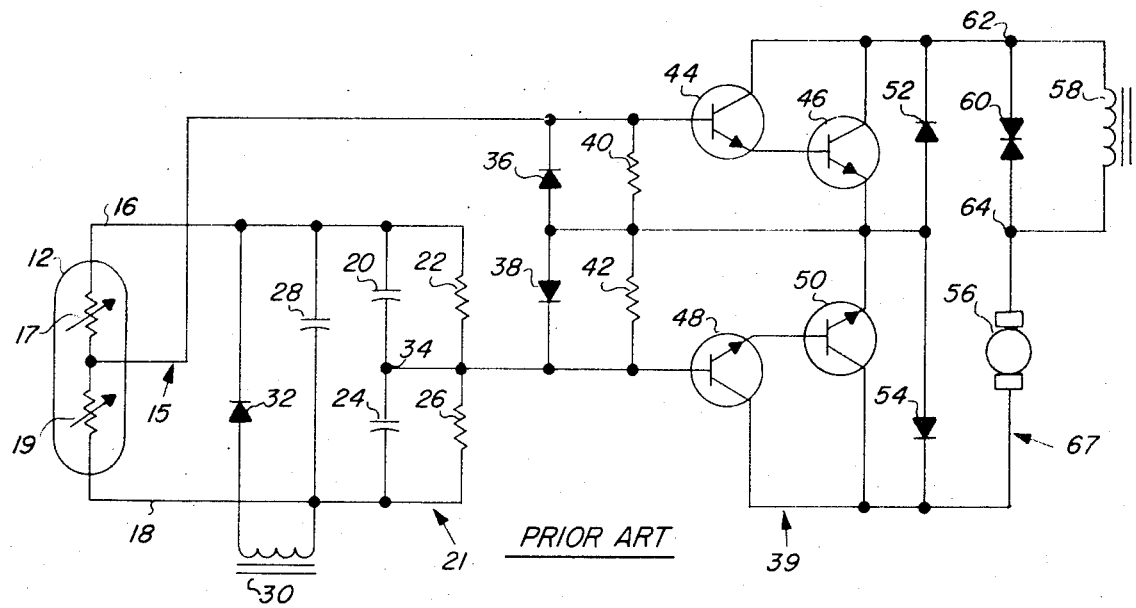
FIG. 2 is an electrical schematic drawing of a typical prior art self-focusing servo amplifier circuit.
Figure 3:
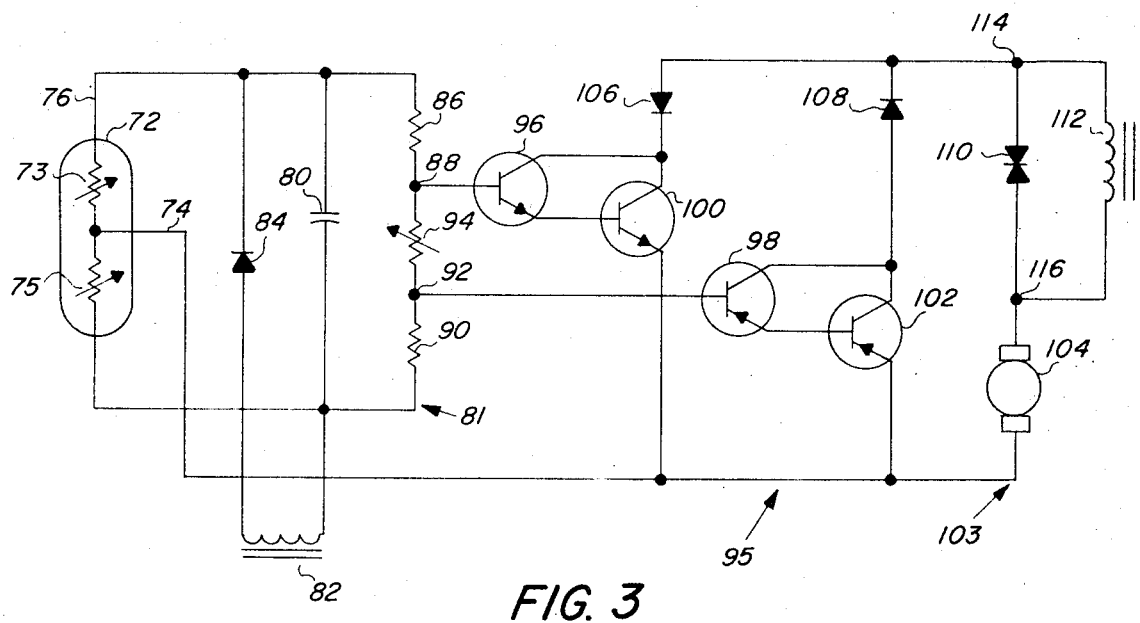
FIG. 3 is an electrical schematic showing of a presently preferred embodiment in accordance with the present invention.

Typical of the basic projection optics and sensors used in accordance with the invention are those schematically illustrated in FIG. 1. Projection lens 4 focuses light transmitted through transparency 7 from projection lamp 5 and condenser lens system represented by lens 6 onto a viewing or display screen (not shown). Light from a small lamp 8 having filament 8' is focused by small lens 9 into a converging bundle directed onto, preferably, the central area of transparency 7 at an oblique angle $\alpha$. Part of the energy in the bundle is specularly reflected at angle $\alpha'$ from the surface of the transparency 7 and forms an image 8'' of the filament 8' on or near the surface of dual photoconductive cell 10. Projection lens 4, small lamp 8, small lens 9 and photoconductive cell 10 are secured to a focusing yoke 11 which is driven in either of two directions parallel to the axis A of the projection lens 4 by a servo motor such as shown in FIGS. 2 and 3. Yoke 11 remains at rest while the amounts of light from filament 8' falling on the two halves 17 and 19 of the photoconductive cell 10 are in balance.

Usually, the projection lens 4 is manually or otherwise moved relative to the yoke to bring a transparency 7 into sharp focus. If the axial position of the transparency 7 spuriously changes, due to the previously discussed reasons, the filament image 8'' falling on the photoconductive cell 10 is displaced laterally in one direction or the other. Such unbalance in the amounts of light from filament 8' falling on the two halves 17 and 19 of the photoconductive cell 10 then causes the servo amplifier and motor to drive the movable yoke 11 in a direction along axis A to restore the balance. When balance has been restored, the movable frame 11 and hence the projection lens 4 are at the same distance from the surface of the transparency 7 as before, and the image of the transparency 7 on the screen is therefore again in sharp focus.

It will be appreciated that the two receiving surfaces 17 and 19 need not be adjacent and that two, separate and spaced photocells can be used. Other optical elements can also be incorporated by one skilled in the art to accommodate any desired photocell configuration and direction. For example, refraction or beamsplitter optics can be used. In any case, photoconductive cell 10 is positioned so that when the transparency 7 is positioned so as to be in focus on the viewing surface, light directed on photoconductive cell 10 is equally distributed on both of its light receiving surfaces 17 and 19. If transparency 7 is slightly displaced along the optical axis A, as from the above discussed causes, a greater amount of light falls on one of the surfaces 17 and 19 of the photoconductive cell 10 than the other. Which side receives the greater amount depends upon the direction of displacement of transparency 7 along axis A. Various materials may be used in the photoconductive cell 10, among them, selenium, germanium, thallous sulfide, lead sulfide, silicon and cadmium sulfide. These materials respond to light in the visible spectrum, as well as to other wavelengths in the electromagnetic spectrum, such as infrared and ultraviolet. In practice, the preferred photoconductive cell 10 is usually of the cadmium selenide type.

Turning now to FIG. 2, a prior art servo amplifier circuit is shown. A bridge circuit generally designated 21 has two arms comprising resistors 22 and 26 shunted by capacitors 20 and 24, respectively, and two opposite arms comprising the two light receiving sections 17 and 19 of the photoconductive cell 12. Bridge 21 is fed at terminals 16 and 18 by a DC voltage derived from the AC source 30, rectifier diode 32, and filter capacitor 28. The output of bridge 21 is a potential appearing between terminal 15 and point 34. If resistors 22 and 26 are chosen to be approximately equal, there will be no potential difference between terminal 15 and point 34 when the resistances of the two sections 17 and 19 of the photoconductive cell 12 are also approximately equal, which is when there is equality in the amount of illumination falling on each of sections 17 and 19. If the incoming light shifts in a direction to reduce the resistance of section 17 and increase the resistance of section 19, or vice versa, the potential at terminal 15 becomes positive relative to point 34, and negative for the vice versa condition, respectively. Bridge 21 outputs across point 34 and terminal 15 through either of two diodes 36 or 38, depending on the direction of the current therethrough. Resistors 40 and 42 are shunted across diodes 36 and 38, respectively, with the cathodes of diodes 36 and 38 connected back-to-back. This circuit outputs through a transistor network generally indicated as 39. This latter network is intended to provide discrete signal transfer channels for clockwise (CW) and counterclockwise (CCW) rotation of reversible DC motor 56. For purposes of clarity, these channels have arbitrarily been identified as channel A for CW rotation and channel B for CCW rotation.

The transistor network 39 comprises four NPN transistors 44, 46, 48 and 50, each having a base, a collector and an emitter as indicated by the conventional symbols in the drawing. The transistors 44 and 46, forming in part the signal path for the CW channel A are connected in amplifying cascade, the collectors being electrically common, and the emitter of transistor 44 being connected to the base of transistor 46. Similarly, transistors 48 and 50, forming in part the signal path for the CCW channel B, are arranged in amplifying cascade, their collectors being electrically connected in common, and the emitter of transistor 48 being connected to the base of transistor 50. Also, the emitters of transistors 46 and 50 are electrically common.

The parallel combination of resistor 40 and diode 36, is electrically connected between the base of transistor 44 and the emitter of transistor 46. Similarly, between the base of transistor 48 and the emitter of transistor 50, resistor 42 and diode 38 are in parallel.

A diode 52 is connected with its cathode to the collectors of transistors 44 and 46 and its anode to the emitter of transistor 46. In a similar manner, diode 54 is connected with its cathode common to the collectors of transistors 48 and 50 and with its anode common to the emitter of transistor 50.

AC input 58 has output terminals connected at 62 and 64 across a thyrector diode 60 for eliminating transient voltage.

In the discussion which follows, all reference will be to conventional current flow. The output of the bridge circuit at terminal 15 and point 34 is connected to the transistor network at the bases of transistors 44 and 48, respectively. When the bridge circuit 21 is in balance, transistors 44 and 48 are cut off. Since transistor 44 is cut off and the base of transistor 46 is connected to the emitter of transistor 44, transistor 46 is also cut off. In a similar manner, since transistor 48 is cut off, transistor 50 is also cut off. Since diodes 52 and 54 are in series opposing, no current flows through the DC motor 56.

Let us assume now that some condition occurs which causes the transparency to be displaced. The bridge 21 will become unbalanced due to a shift in the distribution of a light beam falling onto transducer 12. If terminal 15 becomes positive relative to point 34, base current flows through transistors 44 and 46 in channel A and through diode 38. When the AC source 58 is in the half-cycle when point 62 is positive relative to point 64, current can flow from point 62 through transistor 46 and diode 54, and through the motor 56 to point 64, thus turning motor 56 clockwise.

Conversely, if the light beam falling upon transducer 12 shifts in the other direction, the terminal 15 of bridge 21 becomes negative relative to point 34, and base current flows through transistors 48 and 50 and diode 36. Thus, in the other half-cycle of the AC source 58, when point 62 is negative from point 64, the drive current flows through the motor from point 64 to the point 67 and through transistor 50 and diode 52 to point 62, so that the motor 56 turns in a counterclockwise direction.

The capacitors 20 and 24 of this prior art device and which are not needed when practicing the invention are necessary to: (a) insure high initial current output for the bridge and (b) anticipate the balanced position and prevent hunting of the motor 56. Assume for discussion that the bridge circuit 21 is supplied with a voltage in the order of magnitude of 40 volts. The capacitors 20 and 24 will therefore each be charged to approximately 20 volts. The bridge current output is a function of the change in current brought about by the light beam falling upon the surfaces, plus the transient capacitor current. As is well known, since the voltage across a capacitor cannot change much instantly, the initial electrical disturbance to the bridge produces an initial surge current which is large and is transmitted to either terminal 15 or point 34, where it is amplified by the transistor network of channels A or B, and is immediately applied to the input terminals of motor 56. This has the effect of overcoming the inertia of the motor and starting it rotating in a direction to correct the condition. As the transient situation continues, the bridge current begins to fall off, so that DC pulses of decreasing magnitudes are applied to the motor 56. Concurrently, the capacitors 20 and 24 are charging to a potential somewhat higher than the initial 20 volts, and the higher charged capacitors then attempt to send current through the bridge circuit 21 in the opposite direction. This is tantamount to anticipating that the balanced position will soon be reached by the light beam. As the bridge current output goes through zero, some small current is actually forced in the opposite direction. Although it is of small amplitude, the net result is that pulses of opposite polarity and small amplitude are then applied to the motor 56. These pulses have a braking effect on the rotation of the motor and derivatively anticipate the null position of the light beam to prevent hunting by the motor 56.

A problem of this prior art device is that it has an inherent, relatively large electrical dead zone. When the terminal 15 goes positive, it must get very positive, relative to point 34, to overcome the combined forward voltage drops of the base and emitter junctions of transistors 44 and 46 and diode 38 before transistor 46 can begin to conduct collector current. Similarly, when terminal 15 goes negative, it must go far enough negative from point 34 to overcome the combined forward voltage drops of the base emitter junctions of transistors 48 and 50 and diode 36 before motor 56 can turn.

In checking the effect of this dead zone on a Carousel 850 projector, manufactured by the Eastman Kodak Company of Rochester, N.Y., the shaft of the focusing motor 56 was turned by hand as far as it would go in either direction until the prior art servo amplifier such as shown in FIG. 2 turned on the motor to resist any further movement. Before the motor would turn, the total movement of the focusing yoke 11 seen in FIG. 1, which carries a small light source 8 to be projected onto a photocell such as element 10 was measured to be 0.0113 inches. The corresponding movement of the projection objective was measured on two separate occasions to be 0.0033 inches and 0.0041 inches. Since the objective is geared to move exactly half the distance of the yoke, the discrepancy in these figures is assumed to be due to mechanical backlash.

Turning now to FIG. 3, a schematic diagram for a servo amplifier in accordance with the presently preferred embodiment of the invention is shown. A bridge circuit generally designated 81 has a DC supply potential comprising AC source 82, rectifier diode 84, and filter capacitor 80. One side comprises the two light receiving sections 73 and 75 of the dual photoconductive cell 72. The other side of the bridge 81 comprises three resistors 86, 94, and 90 in ser-ies, with junction points designated 88 and 92, respectively.

If light falls equally on the two halves 73 and 75 of the photoconductive cell 72 so that their resistances are equal, and the two resistors 86 and 90 are selected to be equal, then the potential of the junction point 74 between the two sections 73 and 75 of the photoconductive cell 72 lies halfway between the potentials of the junction points 88 and 92 on the other side of the bridge 81. The potential dif-ference between points 88 and 92 is selectively controlled by the value of resistor 92 relative to the values of resistors 86 and 90. This network provides discrete signal transfer channels for clockwise (CW) and counterclockwise (CCW) rotation of reversible DC motor 104. For the purpose of clarity, these channels are arbitrarily designated channel C for CW rotation and channel D for CCW rotation.

Transistor network generally designated 95 includes four transistors, the two of the NPN type identified as 96 and 100 and two PNP type referred to as 98 and 102.

It will be appreciated that the two control transistors are of opposite polarity. That is, transistor 102 is of the PNP variety, whereas transistor 100 is an NPN type. Furthermore, control transistors 100 and 102 are in series with corresponding diodes 106 and 108. Also, the two transistor diode pairs comprising channels C and D are in parallel relative to the motor circuit.

Bridge circuit 81 is interconnected with the transistor network 95 by connecting the bases of transistors 96 and 98 to resistor junctions 88 and 92, respectively, and connecting the common terminal 74 of the two photoconductive cell sections 73 and 75 to the common junction between the emitters of transistors 100 and 102. When the light beam incident on the dual photoconductive cell 72 shifts in one direction from the central position, the photoconductive cell unbalances such that the voltage at terminal 74 becomes even more negative relative to junction 88 and base current flows from point 88 to point 74 through the base-emitter junctions of transistors 96 and 100, thus causing transistor 100 to conduct collector current. Current from the power source can then flow through the motor by way of channel C. During the half-cycle of the AC power source 112 that the potential at terminal 114 is positive relative to terminal 116, the DC motor 104 is driven clockwise by current flowing through diode 106 and transistor 100. Diode 108 prevents a forward bias from being applied to the collector-base junctions of transistors 98 and 102 during this half-cycle of the power source.

Conversely, when the light beam shifts in the opposite direction, the voltage at point 74 goes positive from the balance point and base current flows from point 74 through the base-emitter junctions of transistors 102 and 98 to point 92, thus allowing transistor 102 to conduct collector current. Then, during the half-cycle when terminal 114 of the power source is negative from terminal 116, the DC motor 104 is driven counter-clockwise by drive current flowing through channel D from terminal 116 through the motor and then through transistor 102 and diode 108 to terminal 114. Diode 106 prevents forward bias from being applied to the base-collector junctions of transistors 96 and 100 during this half-cycle of the power, when transistor 102 is not conducting.

As above pointed out, a particular advantage of the present invention is that by suitably selecting resistors 94, 86 and 90, the bases of transistors 96 and 98 can be held apart by approximately the combined forward voltage drop of the base-emitter junctions of all four transistors, so that only a slight change in the voltage at point 74 of the photoconductive cell 72 in one direction or the other is sufficient to turn on one or the other of the control transistors. If the resistance of resistor 94 is increased in value, a small alternating current can be made to flow through the DC motor 104 when the system is in balance. This produces no net displacement of the DC motor, but the motor is constantly vibrated or jogged which is useful in reducing the standing friction in the mechanical components of the system. Thus, no great surge of current is needed to start the motor turning as is required with the prior art device previously discussed. Thus, no capacitors corresponding to capacitors 20 and 24 are needed to practice the invention although such capacitors can be included in accordance with the invention.

It will also be noted in the prior art device shown by FIG. 2 that the two control transistors 46 and 50 are of the same polarity and are in parallel with corresponding diodes 52 and 54, respectively, and the two transistor-diode pairs 36,40 and 38,42 are in series, relative to the motor circuit.

In addition, it may at times be desirable in other applications to increase the electrical dead zone. In situations where the intrinsic dead zone, when the bases of transistors 96 and 98 are at the same voltage, is insufficient, one need only connect the base of transistor 96 electrically in common with point 92 and the base of transistor 98 electrically in common with point 88.

The amount by which the focusing yoke of the above-mentioned Carousel 850 projector could be moved without turning on the motor measured to be about 0.001 inches. Thus, if there were no play between the focusing yoke and the projection objective, the latter would be positioned with an accuracy of plus or minus 0.0003 inches which is one-tenth of the play allowed in the prior art device of FIG. 2.

Moreover, the invention is not limited to use in slide projectors, but may be incorporated in various optical devices such as moving picture projectors, television systems, microscopes and other devices utilizing self-positioning systems. Such uses will be apparent to those skilled in the art.

This invention has been described in detail with particular reference to preferred embodiments thereof, but it will be understood that variations and modifications can be effected within the spirit and scope of the invention.

I claim:

1. For use in a self-focusing projector wherein an imaged focus is adjusted by moving the image element and an objective lens relative to one another along the optical axis of the objective lens, the invention comprising:

means for detecting displacement of said imaged element relative to a position of focus for said objective lens, said means comprising a first output for providing a first signal of a first polarity representative of displacement of said imaged element from its position of focus in a first direction, a second output for providing a second signal of a second polarity representative of displacement of said image element from its position of focus in a second direction opposite to said first direction, and a third output for providing a reference signal;

means for moving said image element and said objective lens relative to one another along the optical axis of said objective lens;

first circuit means responsive to said detecting means comprising a first control transistor of a first polarity the emitter of which is connected to said reference signal output, the base of which is connected to the first output so that said first control transistor is responsive to said first signal of said first polarity for energizing said moving means to move said lens and said element relatively closer together along said optical axis;

second circuit means responsive to said detecting means comprising a second control transistor of opposite polarity to said first transistor the emitter of said second control transistor being connected to said reference signal output the base of said second control transistor being connected to the second output so that said second control transistor is responsive to said second signal of said second polarity for energizing said moving means to move said lens and said element relatively further apart along said optical axis; and a variable resistor means connected between the bases of the first and second control transistors, which resistor can be adjusted to produce substantially zero resistance between the two bases.

2. The invention of claim 1 wherein said moving means comprises means for repositioning said objective lens along said optical axis.

3. The invention of claim 1 wherein said moving means comprises means for repositioning said imaged element along said optical axis.

4. The invention of claim 1 and wherein said first circuit means further comprises a first current limiting means in series with said first control transistor.

5. The invention of claim 1 and wherein said first circuit means further comprises a first means for limiting current in series with said first control transistor and said second circuit means further comprises second means for limiting current in series with said second control trans-istor.

6. The invention of claim 1 and wherein said first circuit means further comprises first means for limiting current in series with said first control transistor and said second circuit means further comprises second means for limiting current in series with said second control trans-istor and wherein said first control transistor and first current limiting means pair and said second control trans-istor and said second current limiting means pair are both in parallel relative to said moving means.

7. The invention of claim 1 wherein said moving means has an electrical dead zone said adjustable resistance between the bases of said first and second transistors controlling said dead zone such that said dead zone decreases from its maximum to its minimum as said resistance is adjusted from effectively zero to a selected value.

8. The invention of claim 1 wherein said first circuit means comprises an additional transistor of the same polarity as said first control transistor connected in amplifying cascade with said first control transistor.

9. The invention of claim 1 wherein said first circuit means comprises an additional transistor of the same polarity as said first control transistor connected in amplifying cascade with said first control transistor and said second circuit means comprises an additional transistor of the same polarity as said second control transistor connected in amplifying cascade with said second control transistor.

* * * * *

UNITED STATES PATENT OFFICE
CERTIFICATE OF CORRECTION

PO-1050
(5/69)

Patent No. 3,744,894            Dated  July 10, 1973

Inventor(s)  Harvey Orlo Hoadley

It is certified that error appears in the above-identified patent and that said Letters Patent are hereby corrected as shown below:

Column 8, line 16, (Claim 1)  Delete the preamble of claim 1 "For use in a self-focusing projector wherein an imaged focus is adjusted by moving the image element and an objective lens relative to one another along the optical axis of the objective lens, the invention comprising:"

THE PREAMBLE OF CLAIM 1 SHOULD READ AS FOLLOWS:

--For use in a self-focusing projector wherein image focus is adjusted by moving an imaged element and an objective lens relative to one another along the optical axis of the objective lens, the invention comprising:--

Signed and sealed this 17th day of September 1974.

(SEAL)
Attest:

McCOY M. GIBSON JR.
Attesting Officer

C. MARSHALL DANN
Commissioner of Patents